(12) United States Patent
Langhammer (10) Patent No.: US 9,594,928 B1
(45) Date of Patent: Mar. 14, 2017

(54) MULTI-CHANNEL, MULTI-LANE ENCRYPTION CIRCUITRY AND METHODS

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 114 days.

(21) Appl. No.: 14/513,452

(22) Filed: Oct. 14, 2014

(51) Int. Cl.
  *G06F 21/00* (2013.01)
  *G06F 21/72* (2013.01)

(52) U.S. Cl.
  CPC .................................. *G06F 21/72* (2013.01)

(58) Field of Classification Search
  CPC ..................................................... G06F 21/72
  USPC .................................. 713/192, 189; 726/26
  See application file for complete search history.

(56) References Cited

U.S. PATENT DOCUMENTS

| | | | | |
|---|---|---|---|---|
| 9,348,602 | B1* | 5/2016 | Alapati | G06F 9/3869 |
| 2002/0025037 | A1* | 2/2002 | Sano | H04L 9/0643 |
| | | | | 380/44 |
| 2002/0048364 | A1* | 4/2002 | Gligor | H04L 9/0637 |
| | | | | 380/37 |
| 2007/0198851 | A1* | 8/2007 | Goto | G06F 12/145 |
| | | | | 713/187 |
| 2008/0130872 | A1* | 6/2008 | Bolotov | H04L 9/0637 |
| | | | | 380/28 |
| 2008/0130894 | A1* | 6/2008 | Qj | H04L 63/0485 |
| | | | | 380/277 |
| 2008/0172501 | A1* | 7/2008 | Goodart | G06F 13/40 |
| | | | | 710/33 |
| 2010/0128874 | A1* | 5/2010 | Scott-Nash | G09C 1/00 |
| | | | | 380/255 |
| 2015/0082337 | A1* | 3/2015 | Mamidwar | H04N 21/23895 |
| | | | | 725/31 |
| 2015/0149788 | A1* | 5/2015 | Gupta | G06F 12/1408 |
| | | | | 713/189 |
| 2015/0381203 | A1* | 12/2015 | Master | H03M 7/46 |
| | | | | 341/67 |

OTHER PUBLICATIONS

Henzen, L. et al., "FPGA Parallel-Pipelined AES-GCM Core for 100G Ethernet Applications," *IEEE 2010 Proceedings of ESSCIRC*, Seville, Spain, pp. 202-205 (Sep. 14-16, 2010).

* cited by examiner

*Primary Examiner* — Sarah Su (57) ABSTRACT

Encryption/authentication circuitry includes an encryption portion having a first number of encryption lanes, each encryption lane including a plurality of encryption stages, and keyspace circuitry including a plurality of key lanes corresponding to a predetermined maximum number of channels. Each key lane has key storage stages corresponding to the encryption stages, and includes key memories for the predetermined maximum number of channels. Key channel selection circuitry for each stage selects a key from among the key memories at that stage. An authentication portion includes a second number of authentication lanes, hash key storage for the predetermined maximum number of channels, partial hash state storage for the predetermined number of channels, and hash channel selection circuitry. Based on the channel being processed, the hash selection circuitry selects, in each respective lane, respective hash key data from the hash key storage and respective partial hash state data from the partial hash state storage.

22 Claims, 10 Drawing Sheets

FIG. 1

| Lane 1 | Lane 2 |
|---|---|
| 1 | 2 |
| 3 | 4 |
| 5 | 6 |
| 7 | 8 |
| 9 | 10 |
| 1 | 2 |
| 3 | 4 |
| 5 | 6 |
| 7 | 8 |
| 9 | 10 |

| Lane 1 | Lane 2 | Lane 3 |
|---|---|---|
| 1 | 2 | 3 |
| 4 | 5 | 6 |
| 7 | 8 | 9 |
| 10 | 1 | 2 |
| 3 | 4 | 5 |
| 6 | 7 | 8 |
| 9 | 10 | 1 |
| 2 | 3 | 4 |
| 5 | 6 | 7 |
| 8 | 9 | 10 |

| Lane 1 | Lane 2 | Lane 3 | Lane 4 |
|---|---|---|---|
| 1 | 2 | 3 | 4 |
| 5 | 6 | 7 | 8 |
| 9 | 10 | 1 | 2 |
| 3 | 4 | 5 | 6 |
| 7 | 8 | 9 | 10 |
| 1 | 2 | 3 | 4 |
| 5 | 6 | 7 | 8 |

FIG. 2

| Lane 1 | Lane 2 |
|---|---|
| 1 | 2 |
| 3 | 4 |
| 5 | 6 |
| 1 | 2 |
| 3 | 4 |
| 7 | 8 |
| 9 | 10 |
| 5 | 6 |
| 7 | 8 |
| 9 | 10 |

| Lane 1 | Lane 2 | Lane 3 |
|---|---|---|
| 1 | 2 | 3 |
| 4 | 5 | 6 |
| 7 | 8 | 9 |
| 10 | 3 | 2 |
| 1 | 6 | 5 |
| 4 | 9 | 8 |
| 7 | 10 | 3 |
| 2 | 1 | 6 |
| 5 | 4 | 8 |
| 7 | 9 | 10 |

MULTI-CHANNEL, MULTI-LANE ENCRYPTION CIRCUITRY AND METHODS

FIELD OF THE INVENTION

This invention relates to circuitry for implementing multi-channel, multi-lane encryption and authentication that supports an arbitrary number of channels within a fixed number of lanes.

BACKGROUND OF THE INVENTION

Building encryption circuitry for a known encryption application is easy. If the number of channels to be encrypted and authenticated, and data rate of each channel, are known, an appropriate number of lanes of encryption circuitry can be provided. There could be one lane per channel, or if the data rate is higher than the speed of the device, there could be a correspondingly higher number of lanes per channel.

However, if the encryption circuitry is being built for an unknown encryption application—whether as a fixed multi-purpose encryption circuit or as part of a programmable integrated circuit device such as a field-programmable gate array (FPGA) or other programmable logic device (PLD)—then the problem becomes more difficult. Whatever number of lanes may be provided may not easily map to the particular application that a user may attempt to implement.

In one application, a user may need fewer channels than there are lanes. If the data rate is lower than the device speed, that application is trivial; each channel could be encrypted in one lane. But once the number of channels exceeds the number of lanes, or if the data rate exceeds the device speed so that more than one lane is needed per channel, complications can arise.

For example, if there are three lanes and four channels, the four channels will have to be multiplexed onto the three lanes (e.g., by time-division multiplexing). That in itself is not difficult. However, the different channels may have different encryption keys, and even for a given channel the key may change over time. In such a case, for any time slice, the correct key for the correct channel will have to be delivered to the appropriate lane.

Similarly, it may be necessary to divide each channel among multiple lanes because the data rate exceeds the device speed. If so, the same problem of delivering the correct key to the correct lane at the correct time will arise. In addition, depending on the number of channels and the number of lanes, the actual encryption or authentication operations may not be able to complete within the number of clock cycles between appearances of a particular channel in a particular lane.

SUMMARY OF THE INVENTION

In accordance with embodiments of the present invention, multi-lane encryption circuitry may be added to an integrated circuit device. The circuitry may have a fixed size, including a certain number of lanes and a number of stages per lane, and provision for a certain maximum number of channels (although not all channels provided for would necessarily have to be used).

The circuitry could include both an encryption portion and an authentication portion. In the encryption portion, there would be certain number of stages to support a certain encryption key size. For example, ten stages may be needed to support an encryption key size of 128 bits, while fourteen stages may be needed to support an encryption key size of 256 bits. At each stage, the encryption key for each channel would be kept in synchronization with the data for that channel, and there would be an encryption key available at each stage for each channel. Each lane would be able to select the encryption key for the channel that it is operating on.

Similarly, in the authentication portion, a partial hash state would be calculated for whatever channels are being worked on in the various pipes at a given time. A partial hash state is the current state of the calculation of the final hash state, updated using the last text value. In some cases, there will be multiple partial hash states valid at any time. All partial hash states, whether one or many, may be combined once text input has completed, to create the final hash state. The partial hash states would be accumulated on a per channel basis, so that, by the end of the process, complete hash state values for each channel are available. This requires keeping track of which track the hash values are currently being calculated for, as in the case of the encryption keys. But in addition, if the number of clocks between occurrences of a particular channel is too small, multiple partial hash states would have to be calculated for each channel, and those also would have to be kept track of.

Therefore, in accordance with embodiments of the present invention there is provided encryption/authentication circuitry including an encryption portion having a first number of encryption lanes, each encryption lane including a plurality of encryption stages, and keyspace circuitry including a plurality of key lanes corresponding in number to a predetermined maximum number of channels. Each key lane has key storage stages corresponding to the encryption stages, and each key storage stage includes key memories for the predetermined maximum number of channels. The key storage circuitry further includes key channel selection circuitry for each stage to select an encryption key from among the key memories at the key storage stage. An authentication portion includes a second number of authentication lanes, hash key storage for the predetermined maximum number of channels, partial hash state storage for the predetermined number of channels, and hash channel selection circuitry. The hash selection circuitry selects, in each respective lane, respective hash key data from the hash key storage and respective partial hash state data from the partial hash state storage. The respective hash key data and the respective partial hash state data correspond to a channel being processed in the respective authentication lane. Authentication circuitry updates, in each respective authentication lane, the respective partial hash state data, based on the respective hash key data and data in the channel being processed in that respective authentication lane.

A method of operating such circuitry also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Encryption and authentication circuitry according to this invention may be optimized to support a set of encryption and authentication protocols with a fixed number of channels. If implemented in a programmable integrated circuit device, the number of channels may be selectable, but once the configuration is instantiated, the maximum number of channels would be fixed (even once instantiated, the circuitry may be used to operate on fewer than the instantiated maximum number of channels). The described architecture includes multiple lanes each capable of performing the desired encryption protocol. Again, when implemented in a programmable integrated circuit device, the number of lanes may be selectable, but once the configuration is instantiated, the number of lanes would be fixed. The encryption and authentication portions of the circuit can have different numbers of lanes.

The plurality of lanes can support a plurality of channels, but the number of channels may be independent of the number of lanes, and it is not necessary for the number of channels to be an integer multiple of the number of lanes or vice-versa. That can present a bookkeeping challenge, as will be described below, which is solved in accordance with embodiments of this invention.

Although in one example, the encryption protocol may be AES (Advanced Encryption Standard) and the authentication protocol may be GCM (Galois/Counter Mode), any encryption-authentication protocol pair may be used, as long as they are compatible with each other. In AESGCM, the encryption is counter mode, where a changing value (increasing by 1 per encryption operation per lane) is encrypted and then Exclusive-ORed with the data, which is then input to the authentication circuitry. In AESGCM, the counter value may be initialized using AES encryption, or directly from an initialization vector. The hash state or states may be initialized using additional data that does not form part of the ciphertext. The final hash state may be post-processed to create a tag value. Although the discussion that follows focuses on AESGCM, it will be apparent to one of skill in the art how to apply the disclosed principles to other encryption/authentication protocol combinations.

The use of multiple lanes helps increase the throughput of the circuitry. For example, with ten channels, each operating at about 10 Gbps, a total throughput of about 100 Gbps would be possible, even if the speed of the device would not inherently support such throughput. In the description that follows, three or four lanes are described, but as little as two, or many more, could be used, depending on the device speed. If the device speed is about 25 GHz-30 GHz, that would allow 100 Gbps operation of the encryption circuitry with three or four lanes.

Each lane may implement the encryption process in unrolled form, with each round in a separate stage. There may be pipelining between each stage, and any amount of pipelining inside each stage. The level of pipelining is selected to support the required system speed and is independent of the number of channels that need to be supported. There is separate keyspace circuitry for each stage. As described in more detail below, all of the channel keyspaces may be pre-calculated and stored individually in staging registers, but the keyspace will change from clock cycle to clock cycle to correspond with the channel being processed at each stage of each line at a particular time. The number of rounds, or stages, can be, e.g., ten for 128 bit keys or fourteen for 256 bit keys.

Figure 1:
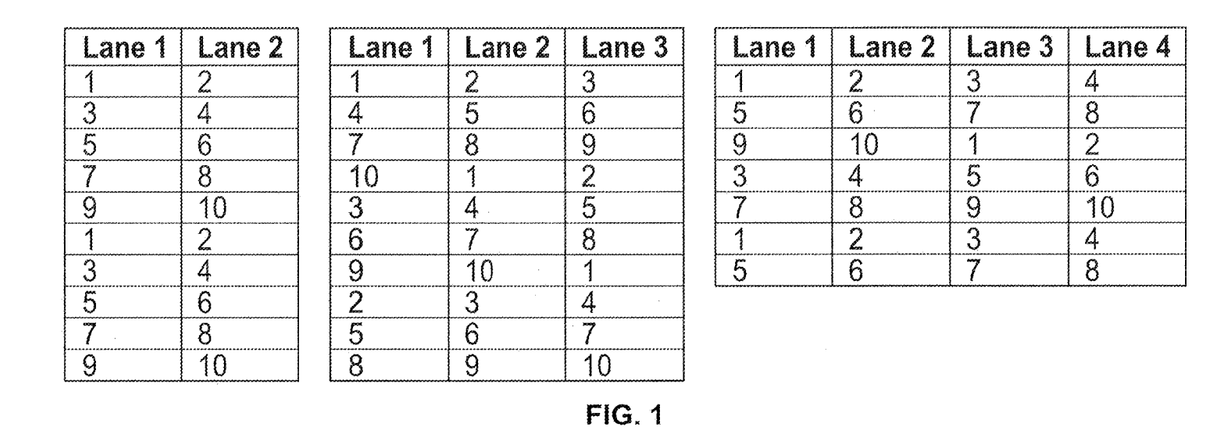
FIG. 1 shows examples of the distribution of a plurality of channels across different numbers of processing lanes.
Figure 2:
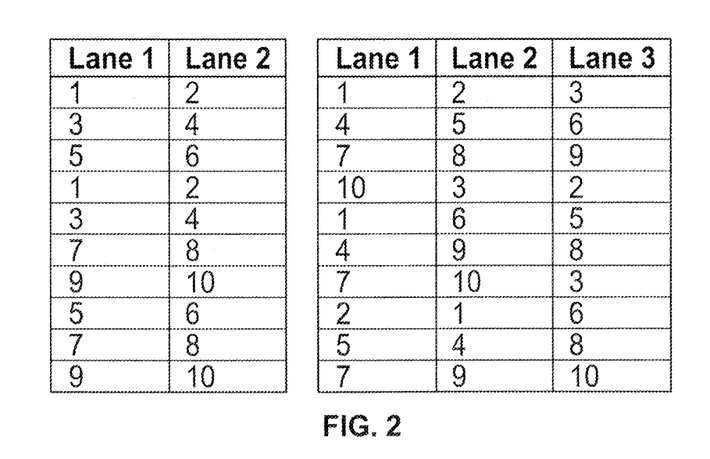
FIG. 2 shows further examples of the distribution of a plurality of channels across different numbers of processing lanes.

The difficulties that are overcome by embodiments of this invention may be illustrated in FIGS. 1 and 2. The channel number and its associated text or data are loaded into each lane. The channel number is staged in lockstep with the processing lane, and used to select which encryption key is used at which stage (see below). The simplest valid channel input sequences for the example of ten channels, with either two, three or four lanes, are shown in FIG. 1. Each of these mappings is a linear increase from lane to lane and then clock to clock, modulo the total number of channels. FIG. 2 shows some more complex sequences, which recognize that some channels may be skipped in a particular sequence because there are no data on them to be processed in a particular clock cycle.

As seen in both FIG. 1 and FIG. 2, each channel may be mapped to a different lane from one occurrence of that channel to the next occurrence of that channel. In the two-lane example in FIG. 1, where each channel appears in each sequence, the odd-numbered channels are always in one lane and the even-numbered channels are always in the other lane. While that is also the case in the two-lane example in FIG. 2, it may not always be the case in a two-lane example, because it depends on which channels are skipped in a particular sequence.

It will be apparent from FIGS. 1 and 2 that while the provision of additional lanes increases the throughput, it also reduces the number of clock cycles between appearances of a channel, which therefore reduces the amount of time available to process each channel. For example, in FIG. 1, there are five clocks between each occurrence of each channel in the two-lane example, but in the four-lane example, there are only two clocks between each occurrence of each channel. This may particularly affect the authentication portion, as discussed below.

Figure 3:
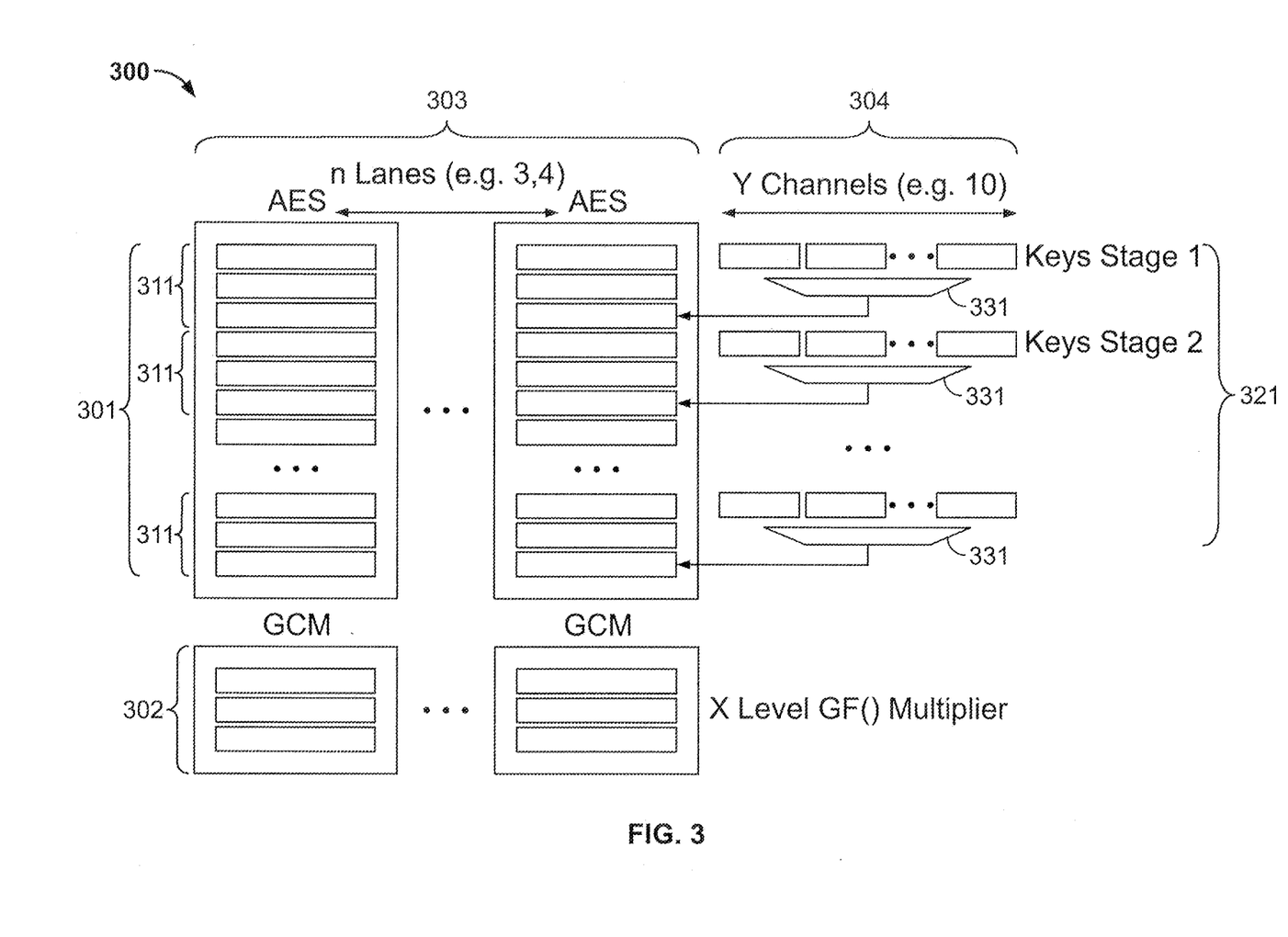
FIG. 3 shows top level architecture of encryption/authentication circuitry according to an embodiment of the invention.

FIG. 3 shows the top level architecture of an embodiment of encryption/authentication circuitry 300, with encryption portion 301 and authentication portion 302. As shown, the number of lanes 303 is the same in both encryption portion 301 and authentication portion 302, although that is not necessary.

Encryption portion 301 also includes a pre-calculated key space 321 for each round or stage 311, with a plurality of key lanes 304 in parallel with the parallel encryption lanes 303.

The number of key lanes 304 equals the maximum number of channels that can be processed (remember that the circuitry is built for some maximum number of channels but the actual number of channels used may be less than that maximum number; the remainder of this discussion assumes that the maximum number of channels is in use). In this drawing, three to four encryption lanes per round are shown for the purpose of illustration.

A set of multiplexers 331 at each stage 311 allows each encryption lane 303 to select the appropriate encryption key, from the keyspace 321 at that stage 311, corresponding to the channel currently in that encryption lane 303 at that stage 311. During operation, the text or data for each channel are loaded into each lane 303. Because, as noted above, the channels will likely be mapped to a different lane 303 from one input of that channel to the next input of that channel, the channel number is staged, through registers 401 (FIG. 4), in lock step with the processing lane 303, and used to select which encryption key is used at which stage.

Figure 4:
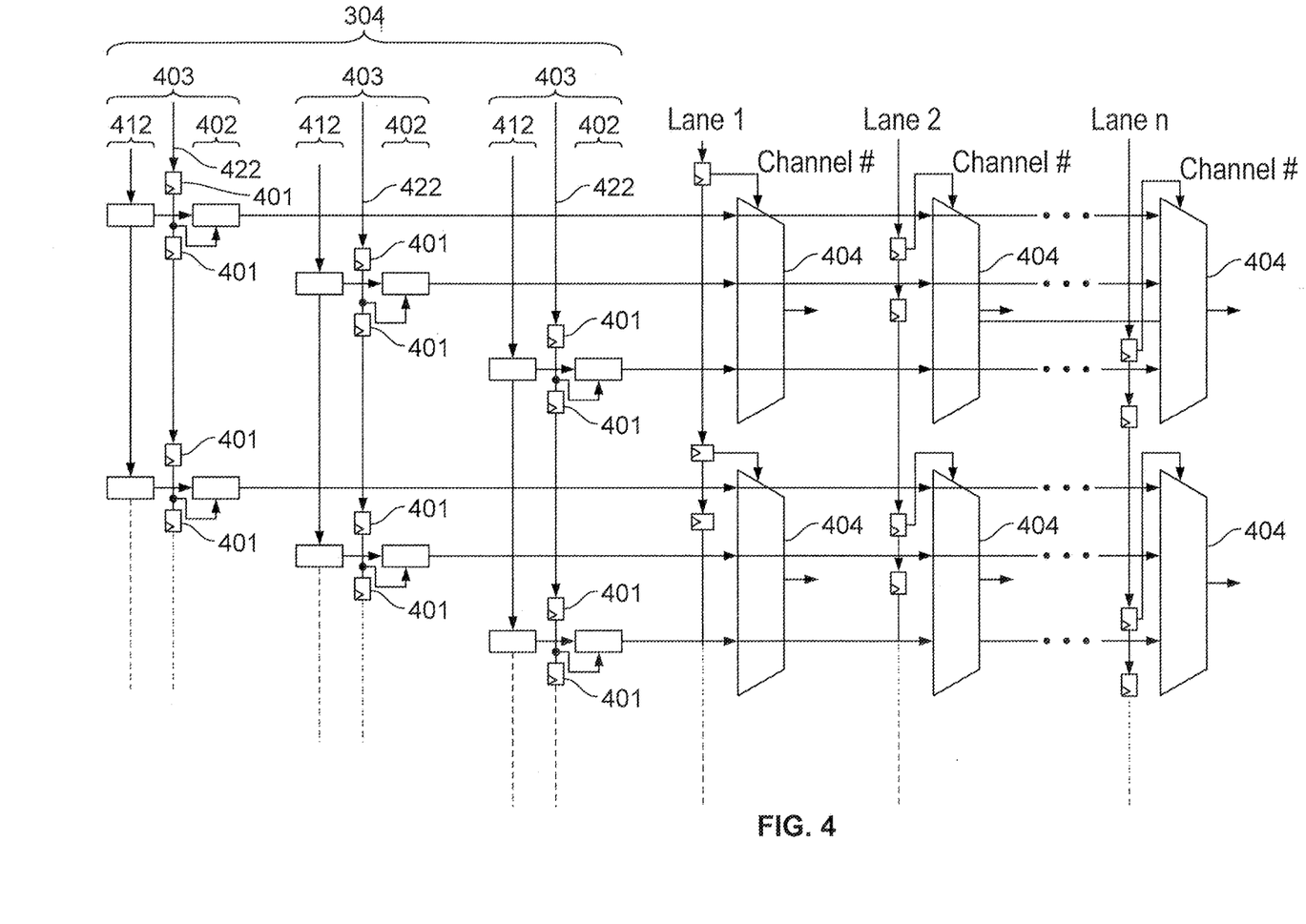
FIG. 4 shows an implementation of key selection circuitry according to an embodiment of the invention.

The details of the key selection are shown in FIG. 4 for two stages 311. For each stage 311, the keyspace 321 has Y working key registers 402 and Y staged key registers 412, where Y is the maximum number of channels (it is possible that fewer than all available channels will be used). The functions of staged key registers 412 will be described below.

The current encryption keys will be in working key registers 402. As noted above, the channel number is staged, through registers 401, which are arranged in channel number lanes 403, in lock step with the processing lanes 303. For each particular processing lane 303, the channel number in the corresponding channel number lane 403 causes a corresponding one of multiplexers 404 to select from working key registers 402 the encryption key for the correct channel for that processing lane 303.

Although the keyspace is shown in FIG. 4 only for encryption keys in encryption portion 301, a similar arrangement will be provided for the authentication keys in authentication portion 302.

It is likely that each channel will have its own key space, although some channels may share encryption keys. It is possible that some channels may share the same encryption key, but have different authentication keys, and generation different authentication values, or tags as they are commonly called.

The encryption keys may be calculated contemporaneously, in which case they can be loaded directly into working key registers 402. However, in such a case, a channel cannot be used while its associated key is being calculated. Alternatively, the encryption keys can be pre-calculated and loaded into key staging registers 412. Each staging register 412 can be loaded with the next encryption key for a channel register while that channel is being used. A switch key signal 422 is generated at the top of each lane as the AND of a "start of packet" signal and the channel number corresponding to that encryption key. The switch key signal is pipelined by the number of stages, but the entire switch key pipeline is advanced by one clock cycle with respect to the data pipeline. This allows the staged key to be switched to the working key register exactly when it is first needed, but still allowing an encryption operation for the same channel for an earlier packet with a different encryption key to complete correctly.

The authentication stage is similar in some respects in that there are multiple lanes and different channels may appear in different lanes from time to time.

A number of values, including hash key values H, are initialized for the authentication step.

In one implementation, a separate iterative encryption circuit or module (this may be an additional occurrence of the encryption circuitry used in connection with the keyspace, as described above) is used to generate all the values, which are then stored in staging registers (a separate set of registers is used for each channel). Alternatively, the main encryption engine can be used to calculate the H can be deterministic or opportunistic, depending on the way the system works), or by dedicating one channel just for initialization of values. A Galois-field multiplier in the authentication circuitry also can be used this way to calculate the H values, either by using empty issue slots, or by dedicating a slot to specifically for H value calculations.

For example, if an encryption lane 303 is used to calculate the H value and AESGCM encryption/authentication is being used), H=AES(K,0)—i.e., the AES encryption of a plaintext containing 0 with the key used for the hash. In the case of AESGCM, the key K is used for both encrypting the plaintext and generating H. Once a valid key K is in registers 422, encrypting a 0 input before starting the plaintext encryption will generate a valid H for that channel.

The calculated H values may be loaded from staged registers into working registers when a new packet is started for the channel it is associated with, as described above in connection with the key space (see FIG. 4). Depending on the level of pipelining in the authentication stage (specifically in the Galois-field multiplier in the case of GCM authentication), and taking into account the number of channels and the number of clocks between inputs for the same channel, multiple powers of H may be required (as described in more detail below). The higher powers of H also can be calculated ahead of time, either using by a separate Galois-field multiplier, or by using serial multipliers to save logic (because the initialization of channel values can be done ahead of time independently of the channel operation). A case using H, as well as a case using both H and $H^2$, are described below.

Figure 5:
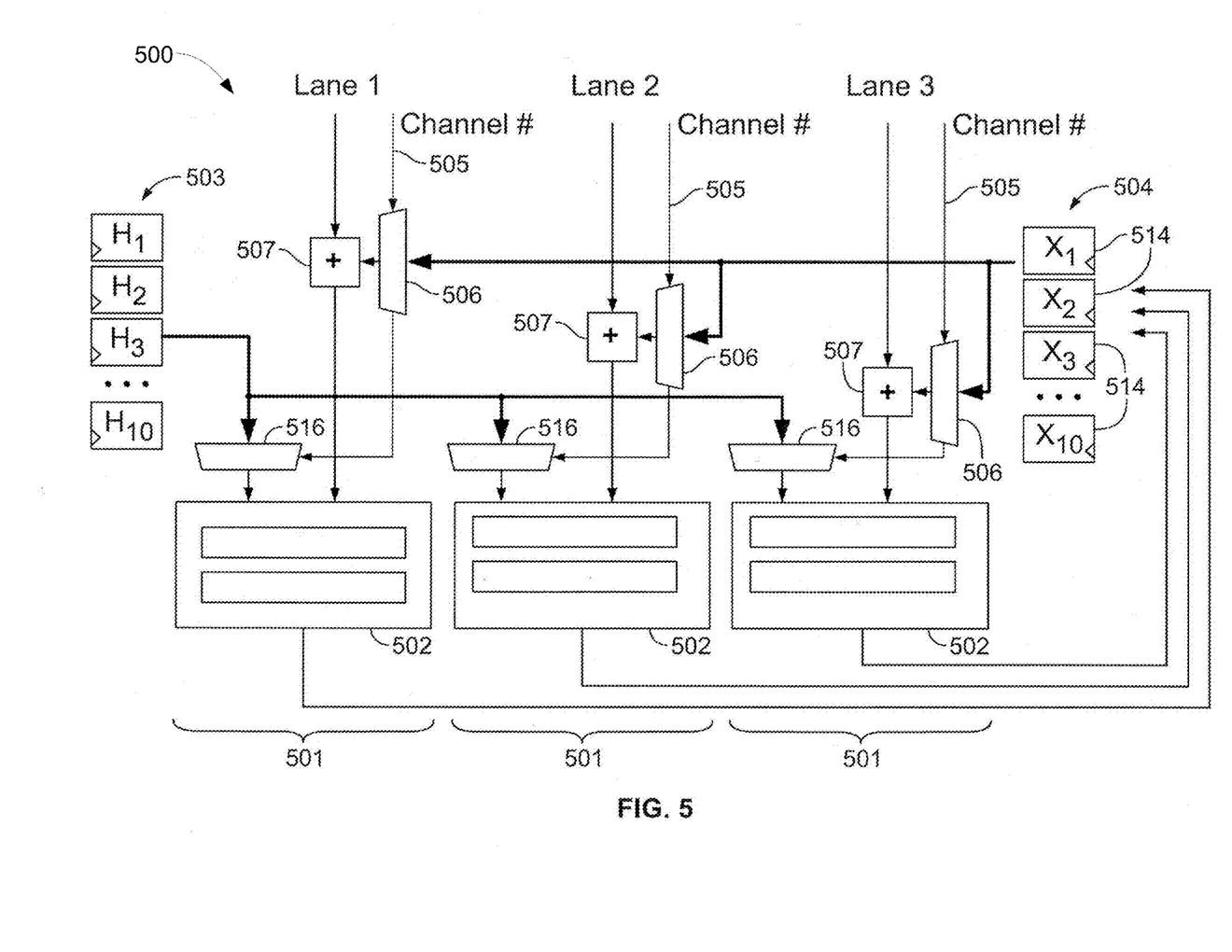
FIG. 5 shows a first implementation of authentication circuitry according to an embodiment of the invention.

FIG. 5 shows the authentication stage 500 in a three-lane, ten-channel system (it is not necessary for the number of lanes in the authentication stage to be the same as the number of lanes in the encryption stage; however, by stages). In this example, there is one Galois-field multiplier 502 in each lane 501, with each multiplier 502 each fed by two pipelines 503, 504. Pipeline 503 on the left side of the drawing is loaded with ten H values (one for each channel), and pipeline 504 on the right side of the drawing contains ten X values (current hash states for each channel). The channel numbers 505, piped in as described above in connection with the encryption stage, control multiplexers 506, 516 which select the appropriate values of H and X, respectively, for each multiplier 502. On every clock cycle containing valid text output data for one of the encryption lanes 303, the text is summed at 507 with the current hash state (X) for that channel, and then multiplied by the H value for that channel. The result is written back to the same X register 514, so that registers 514 accumulate the current hash states.

Thus, as in the case of the encryption stage, it is not necessary in the authentication stage for any particular channel to appear in any particular lane, as long as the channel number is staged in lockstep with the data being processed. However, the arrangement of FIG. 5 assumes that a sufficient number of clock cycles between inputs of a particular channel to compute a hash state by direct application of Horner's rule:

Hash State=$((((X_5H+X_4)H+X_3)H+X_2)H+X_1)H+X_0$

For example, as seen in the two-pipe and three-pipe cases in FIG. 2, the number of clocks between inputs of a particular channel is at least 3 and as many as 5. This is sufficient for the 3-clock round trip arrangement shown in FIG. 5 (one clock for each addition and two clocks for each multiplication).

However, if the amount of pipelining is greater than the number of clocks between any two inputs of the same channel, additional powers of H may be needed to calculate the clock longer than the time between the two inputs, two partial hash states must be calculated, which are then combined to make the final hash state:

Hash State=$(((X_5H^2+X_3)H^2+X_1)H^2+(((X_4H^2+X_2)H^2+X_0)H$

The channel tag can be generated anytime after the packet being processed has been completed, including during processing of the next packet on that channel. The end packet signal for that channel starts a completion sequence for the hash state, which may be stored in an optional hash state hold register (not shown), added to the packet length. If the hash for a channel is updated a maximum of less often than the round-trip delay, the final hash state is the same as the partial hash state. If the hash for a channel is updated a maximum of twice during a round-trip delay, the final hash state is the higher index partial hash state (which will have been calculated by multiplying by $H^2$) added to the current calculation (which will be calculated by multiplying by H instead of by $H^2$). If the gap between two channel inputs is more frequent, a more complex partial hash state calculation and completion sequence is used, such as that described in copending, commonly-assigned U.S. patent application Ser. No. 14/513,519, filed concurrently herewith.

Each generated value (including H and any powers of H) has a valid signal output. When a value is generated, a valid signal is asserted when the value is written to its staging register. When the next packet for the channel associated with that value is started, the staging register is transferred to the working register, and the valid signal is de-asserted. The value remains in the staging register, so the same value will be used for the next packet if a new one is not generated. The valid signal therefore also as an available signal—when the valid signal is asserted, a value is in the staging register which has not been used yet. When or contains a value which has already been used, so it is safe to overwrite the contents of the staging register.

Figure 6:
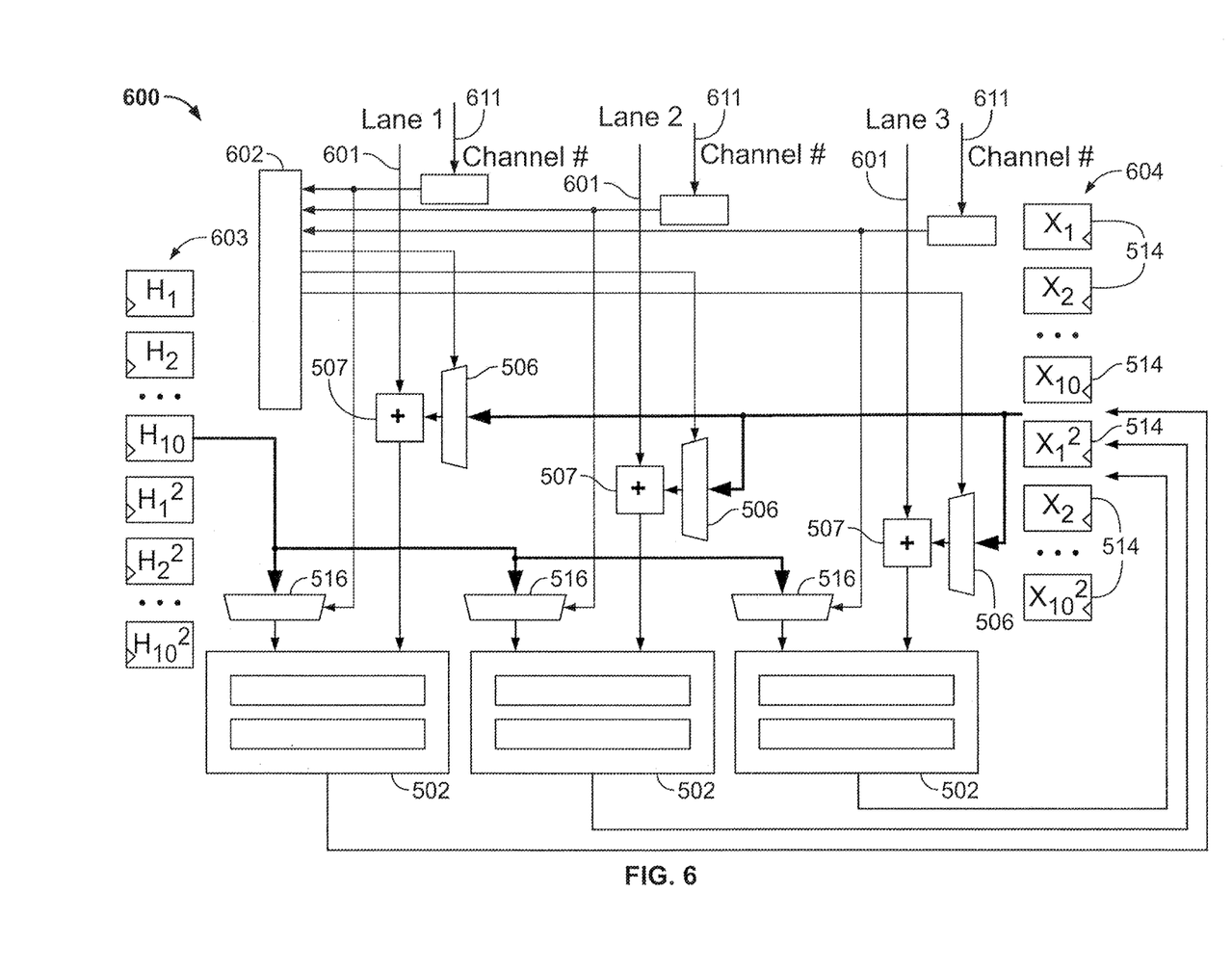
FIG. 6 shows another implementation of authentication circuitry according to an embodiment of the invention.

FIG. 6 shows the case of a more deeply pipelined authentication circuit 600. The next power of H is provided for each hash state, as well as odd and even partial hash states. The powers of H are stored in register bank 603. This circuit can be used for any number of lanes, depending on the relationship on gaps between inputs and the round-trip latency in the authentication circuit. For example, the 2-lane system of FIG. 2, where there are five clocks between occurrences of a particular channel, could use circuit 600 if the round-trip latency were six clocks.

Each encryption lane output 601 has a channel number 611 associated with it. The channel number is input to control circuit 602 which keeps track of which partial hash state (even, stored in $X_n$, or odd, stored in $X^2_n$) is current for that channel, and updates it, so that the other partial hash state (odd or even, respectively) will be used the next time that channel output is received from any encryption lane. The partial hash states are stored in register bank 604.

$H^2$ is used for every update of the partial hash state values, except for the last update of the even partial hash state, where H is used. Otherwise, the multiplexer pattern for multiplexing H into each multiplier may decoded directly from a binary to one-hot multiplex encoder for each multiplier lane.

If there are more than two hash updates per channel request within one round-trip length, the circuitry can optionally apply back pressure (e.g., stop that encryption lane by outputting a "busy" indication or "stall" signal back to the encryption circuitry) until the congestion is cleared (i.e., one of the hash updates in the channel has been written back to the partial hash state registers). Alternatively, the faster and more complex partial hash state calculation and completion sequence referred to above, such as that described in the aforementioned U.S. patent application Ser. No. 14/513,519, may be used.

Figure 7:
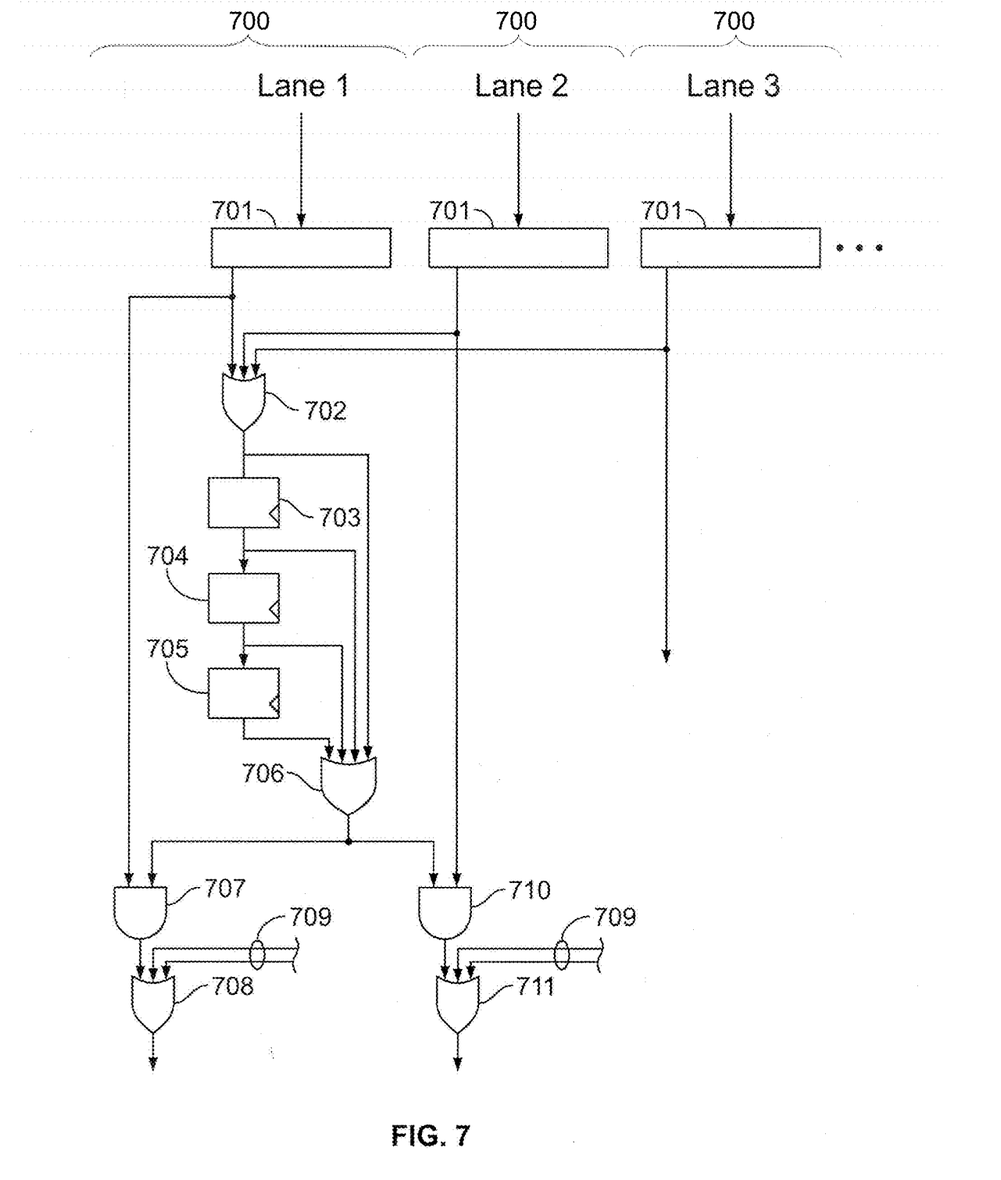
FIG. 7 shows an implementation of stall signal circuitry according to an embodiment of the invention.

One implementation for generating a stall signal may be described with reference to FIG. 7. One-hot, or unary, encoder 701 in each encryption lane 700 generates a unary signal to indicate which channel is on the output of that encryption lane 700. Encoder 701 is replicated for each lane 700. All bits for a given channel across all lanes are ORed together by OR-gate 702. This will indicate if a particular channel is active anywhere at the input of the authentication block. This signal is delayed by the roundtrip delay of the authentication operation, in this case three cycles, by providing registers 703, 704, 705 (which may be programmably incorporated based on the particular implementation of the overall system). If any authentication operation has been issued for a particular channel for any lane during the round trip delay (i.e., an authentication operation is still in progress), OR-gate 706 will output a '1'. That signal is then ANDed at 707 with the channel indication from encoder 701 for that lane. Although this arrangement is drawn for one channel in one lane, every channel will have an individual back-pressure indication (output of 707) for each respective lane. All channel back-pressure indications for that lane (indications from other channels are indicated at 709) are ORed in OR-gate 708 to create a lane back-pressure signal, which can be used to halt the lane operation until the hash has cleared. The entire pipe for the affected lane is halted, not just the conflicting channel. This circuitry may be replicated across all lanes. In this example, gates 710 and 711 provide the back-pressure signal for the next lane.

Figure 8:
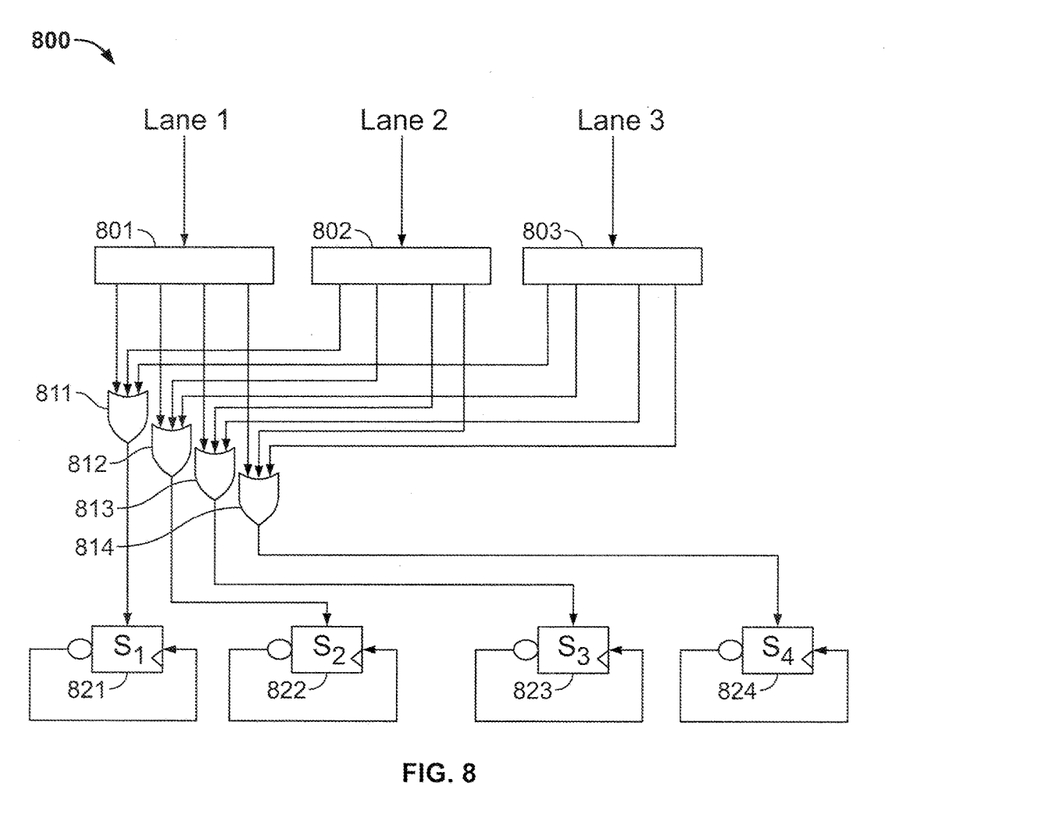
FIG. 8 shows an implementation of channel-tracking circuitry according to an embodiment of the invention.

FIG. 8 shows how the current partial hash state (odd or even) is tracked for each channel by circuitry 800. This channels. Each lane output has a channel number associated with it. This circuit assumes that only one encryption per channel can be issued per clock cycle, although another encryption for that channel can follow on the next clock cycle. The channel number in each lane is converted at 801, 802, 803 to a one-hot value, and all bits for any channel are ORed together. This will create a '1' on the output of the OR-gate 811, 812, 813, 814 for that channel if the channel appears in any lane, which will enable the indicator register s1-s4 (821-824) for that channel. The register will then flip state.

Figure 9:
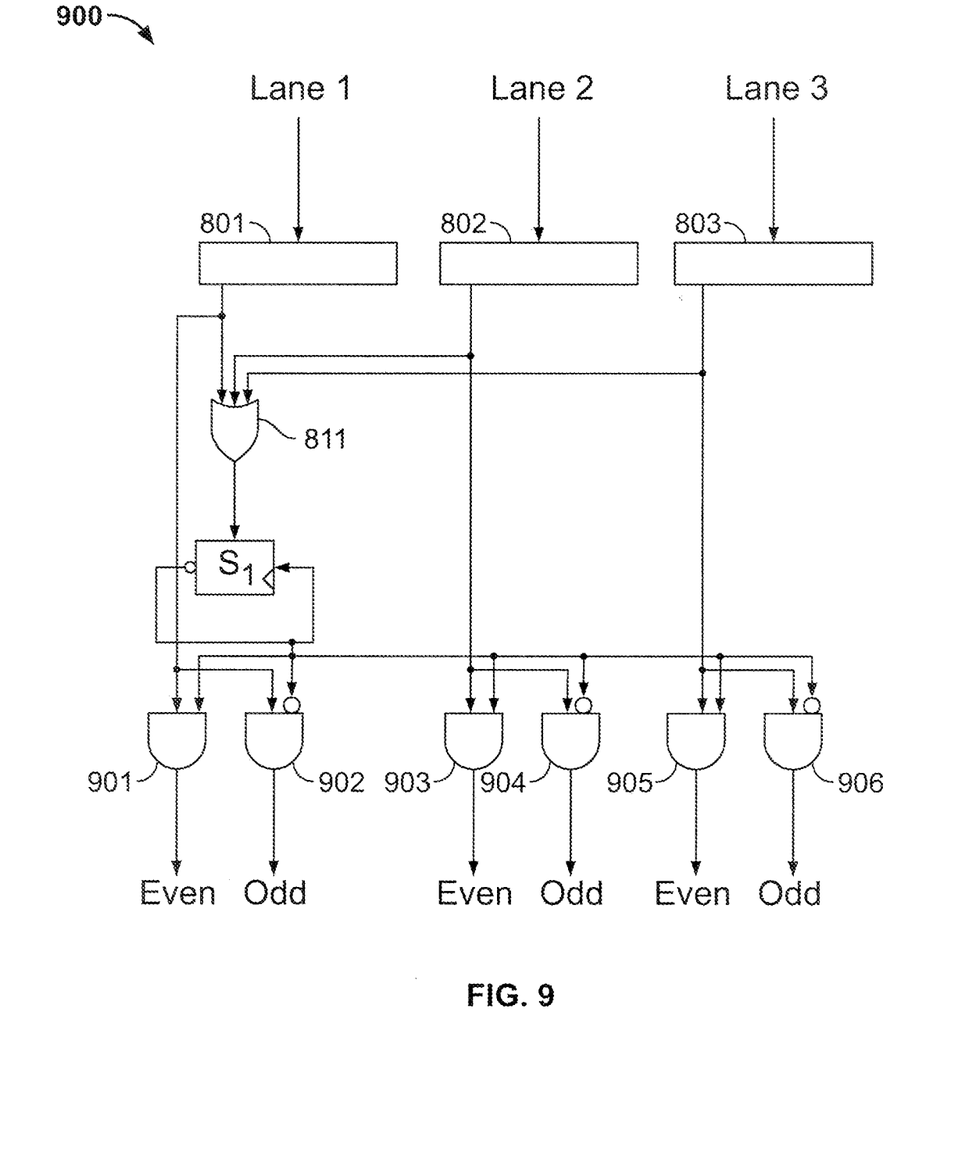
FIG. 9 shows an implementation of partial-hash selection circuitry according to an embodiment of the invention.

FIG. 9 shows how the registers s1-s4 (821-824) are used to select the even or odd partial hash state. Circuitry 900 is shown for channel 1 only, to avoid crowding the drawing, but circuitry 900 is replicated for each channel. The one-hot functions 801, 802, 803 are the same as in FIG. 8 and operate on a per-lane basis. The resulting one-hot selection bit is input to all AND-gates 901-906. The state of indicator register 821 is input to AND-gates 901, 903, 905. The inverse of the state of indicator register 821 is input to AND-gates 902, 904, 906. If the resulting one-hot selection bit for lane 1 selects channel 1, then in lane 1, the even partial hash state is selected if the indicator register $s_1$ (821) is high, and the odd partial hash state is selected if the indicator register s1 (821) is low. Similarly, if the resulting one-hot selection bit for lane 2 selects channel 1, the even partial hash state is selected if the indicator register $s_1$ (821) is high, and the odd partial hash state is selected if the indicator register $s_1$ (821) is low. The same would be true in all lanes for channel 2, and for channel 3, etc. Thus all lanes, no matter how many, can use a single indicator register $s_n$.

Figure 10:
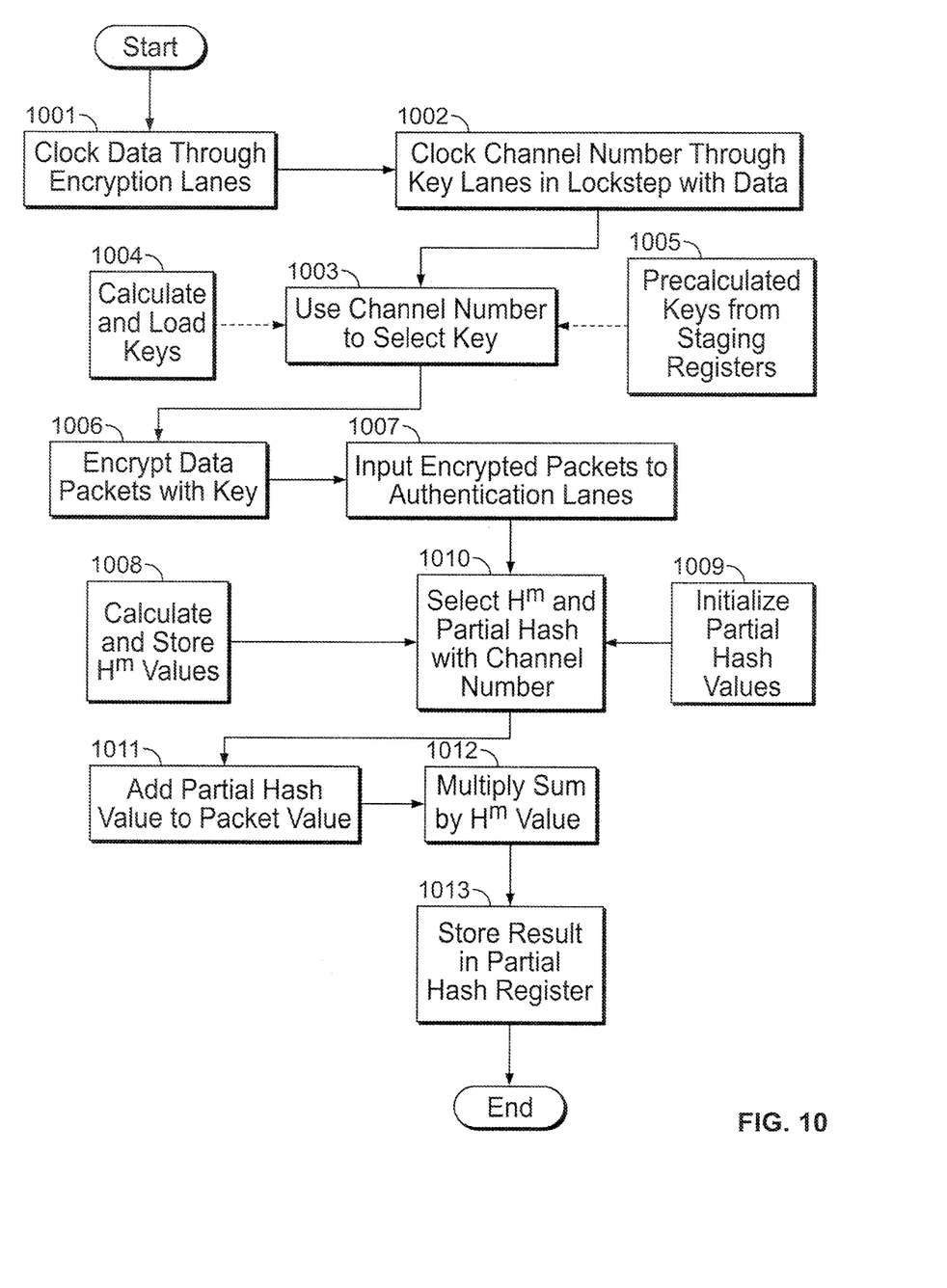
FIG. 10 is a flow diagram of a method according to an embodiment of the present invention for operating a device incorporating the present invention to perform authentication and encryption.

Encryption/authentication circuitry 300, as described above, may be operated to perform encryption and authentication of an arbitrary number of channels as follows (see FIG. 10):

Packets of data to be encrypted are clocked through encryption lanes 303 (as at 1001). At the same time, the channel number for the data in each packet is clocked in lockstep through key lanes 304 (as at 1002). The channel numbers in key lanes 304 select the appropriate encryption key (as at 1003) from the appropriate working key register 402 (which will have been loaded directly upon calculation as at 1004, or from precalculated encryption keys in staged key registers 412 based on switch key signal 422 as at 1005). Encryption lanes 303 operate on the data packets using the selected encryption key (as at 1006).

The resulting encrypted packets, identified by channel, are then input (as at 1007) to the authentication lanes, which may be the same or different in number than encryption lanes 303. H values, and $H^2$ values if needed, will have been calculated and stored in registers 503/603, as at 1008), while the partial hash states are initialized in registers 514 (as at 1009). The channel number for each packet in each authentication lane will be used, as at 1010, to select the appropriate $H^m$ value and the appropriate partial hash state. The partial hash state will be added at 507 (as at 1011) to the value in the packet, which will then be finite-field-multiplied at 502 (as at 1012) by the selected $H^m$ value, and stored back into the appropriate partial hash state register 514 (as at 1013).

Thus it is seen that encryption/authentication circuitry, and methods for operating such circuitry, have been provided.

A PLD 140 configured to include encryption/authentication circuitry according to an implementation of the present invention may be used in many kinds of electronic devices. One possible use is in an exemplary data processing system 1400 shown in FIG. 11. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

Figure 11:
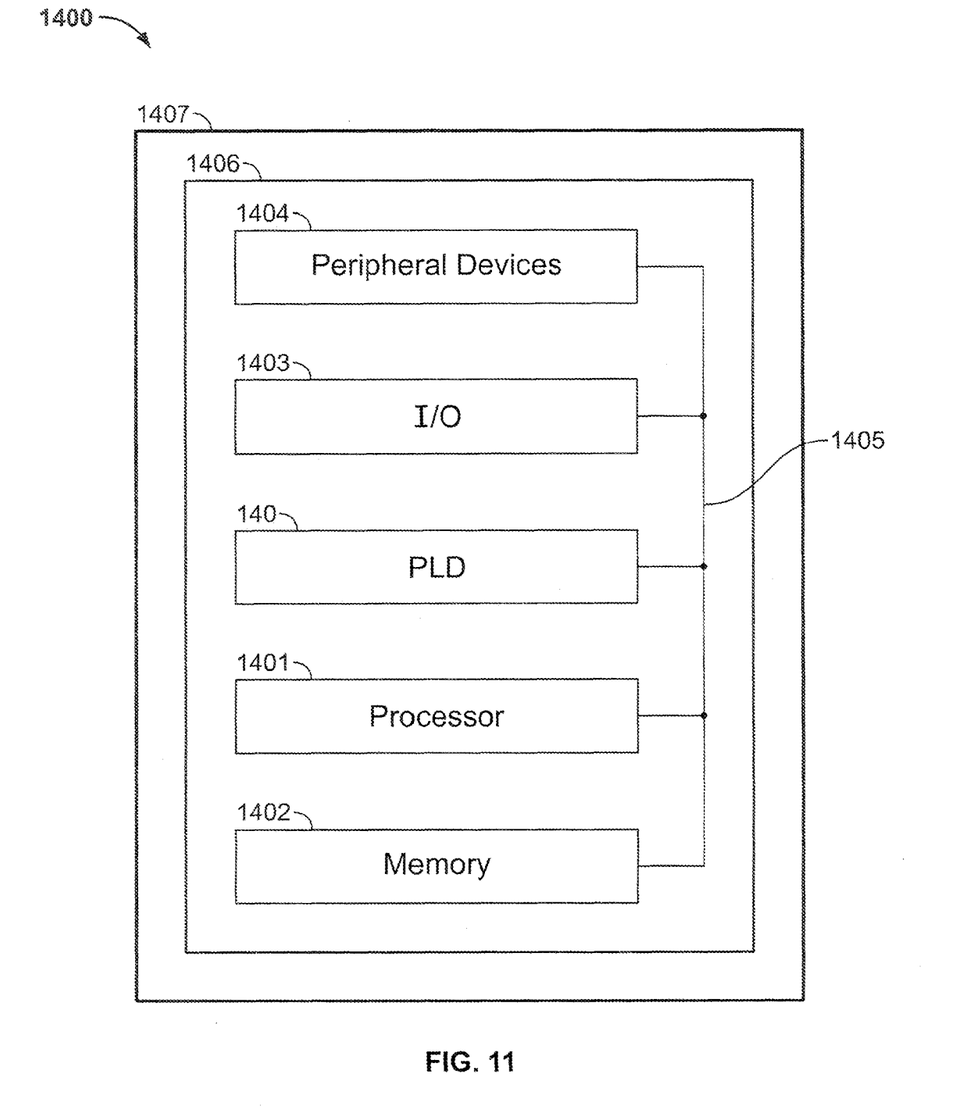
FIG. 11 is a simplified block diagram of an exemplary system employing a programmable logic device incorporating the present invention.

System 1400 can be used in a wide variety of applications, such as computer networking, data networking, instrumentation, video processing, digital signal processing, Remote Radio Head (RRH), or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Encryption/authentication circuitry comprising:
an encryption portion including:
a first number of encryption lanes, each encryption lane including a plurality of encryption stages, and
keyspace circuitry including a plurality of key lanes corresponding in number to a predetermined maximum number of channels, each key lane having key storage stages corresponding to said encryption stages, each key storage stage including key memories for said predetermined maximum number of channels, said key storage circuitry further including key channel selection circuitry for each stage to select an encryption key from among said key memories at said key storage stage; and
an authentication portion including:
a second number of authentication lanes,
hash key storage for said predetermined maximum number of channels,
partial hash state storage for said predetermined number of channels,
hash channel selection circuitry for selecting, in each respective lane, respective hash key data from said hash key storage and respective partial hash state data from said partial hash state storage, said respective hash key data and said respective partial hash state data corresponding to a channel being processed in said respective authentication lane, and
authentication circuitry for updating, in each respective authentication lane, said respective partial hash state data, based on said respective hash key data and data in said channel being processed in said respective authentication lane.

2. The encryption/authentication circuitry of claim 1 wherein said first number and said second number are different.

3. The encryption/authentication circuitry of claim 1 wherein said first number and said predetermined maximum number are different.

4. The encryption/authentication circuitry of claim 3 wherein said predetermined maximum number is a non-integer multiple of said first number.

5. The encryption/authentication circuitry of claim 1 wherein said second number and said predetermined maximum number are different.

6. The encryption/authentication circuitry of claim 5 wherein said predetermined maximum number is a non-integer multiple of said second number.

7. The encryption/authentication circuitry of claim 1 wherein said key selection circuitry comprises, for each respective one of said encryption lanes:
 a respective multiplexer in each one of said key storage stages for selecting an encryption key from one of said key memories in said one of said key storage stages; and
 a channel indicator pipeline containing channel selection data indicating which of said channels is being processed in each respective one of the encryption stages corresponding to each respective one of the key storage stages, said channel selection data controlling each said respective multiplexer.

8. The encryption/authentication circuitry of claim 1 wherein, for each of said key lanes:
 said key memories in each of said key storage stages comprise a working key register and a staged key register; and
 said key selection circuitry further comprises a key switch indicator pipeline containing key switch data indicating when an encryption key should be transferred from said staged key register to said working key register.

9. The encryption/authentication circuitry of claim 1 wherein said authentication circuitry comprises, for each respective authentication lane:
 circuitry for selecting, from said partial hash state storage, partial hash state data corresponding to a channel being processed in said respective authentication lane, and for selecting, from said hash key storage, hash key data corresponding to said channel being processed in said respective authentication lane;
 an adder for combining said partial hash state data with data in said channel being processed in said respective authentication lane; and
 a multiplier for combining output of said adder with said hash key data.

10. The encryption/authentication circuitry of claim 9 wherein said selection circuitry comprises:
 one-hot circuitry for each respective authentication lane to convert binary channel identification data in each respective authentication lane to one-hot channel identification data for each respective authentication lane;
 a plurality of OR-gates corresponding to said predetermined maximum number of channels, each of said OR-gates combining, for a respective one of said channels, bits in said one-hot channel identification data of all said authentication lanes corresponding to said respective one of said channels; and
 a respective indicator register receiving output from a respective one of said OR-gates, each respective indicator register changing state when said output indicates presence of data from said respective one of said channels.

11. The encryption/authentication circuitry of claim 10 wherein:
 said partial hash state data comprise, for each respective channel, multiple partial hash state terms for said respective channel; and
 said circuitry for selecting selects one of said multiple partial hash state terms for said channel being processed based on said state of said respective indicator register for said channel being processed.

12. The encryption/authentication circuitry of claim 11 wherein:
 said hash key data comprise, for each respective channel, multiple powers of a hash key for said respective channel; and
 said circuitry for selecting selects one of said multiple powers of said hash key for said channel being processed based in part on said state of said respective indicator register for said channel being processed.

13. The encryption/authentication circuitry of claim 11 wherein said circuitry for selecting further comprises, for each respective channel, circuitry that selects one of said partial hash state terms for a respective authentication lane when said one-hot circuitry for said respective authentication lane indicates said respective channel and said respective indicator register for said respective channel is in a first state, and that selects another of said partial hash state terms for a respective authentication lane when said one-hot circuitry for said respective authentication lane indicates said respective channel and said respective indicator register for said respective channel is in a second state.

14. The encryption/authentication circuitry of claim 11 wherein said circuitry for selecting comprises, for each respective channel:
 a respective pair of AND-gates for each respective authentication lane, wherein:
 a first AND-gate in said respective pair of AND-gates has, as a first input, an output, from said one-hot circuitry, corresponding to said respective channel, and, as a second input, output of said indicator register for said respective channel; and
 a second AND-gate in said respective pair of AND-gates has, as a first input, said output, from said one-hot circuitry, corresponding to said respective channel, and, as a second input, inverse of said output of said indicator register for said respective channel.

15. A method of encrypting and authenticating a plurality of channels of data using circuitry having a first number of encryption lanes, a second number of authentication lanes, and encryption key circuitry for a predetermined maximum number of channels; said method comprising:
 loading encryption keys for each of an operating number of channels into registers in said encryption key circuitry, said operating number being at most equal to said predetermined maximum number;
 loading hash key data into hash key registers in said authentication lanes;
 initializing partial hash state registers in said authentication lanes;
 clocking packets of data to be encrypted through said encryption lanes, ones of said packets in any one of said encryption lanes belonging different ones of said operating number of channels;
 clocking channel numbers for said data in each packet in lockstep with said packets through key lanes in said encryption key circuitry, and through said authentication lanes;
 selecting ones of said encryption keys from ones of said registers in stages of said encryption lanes based on channel numbers in corresponding stages of said key lanes;
 encrypting each of packets using said ones of said encryption keys;
 inputting said encrypted packets to said authentication lanes;
 selecting ones of said hash keys from ones of said hash key registers in stages of said authentication lanes based on channel numbers in corresponding stages of said authentication lanes;

selecting ones of said partial hash states from ones of said partial hash state registers in stages of said authentication lanes based on channel numbers in said authentication lanes;

adding each selected partial hash state to a value in a selected packet to form a respective sum;

multiplying each respective sum by a selected hash key to form a respective product; and storing each respective product back into respective one of said partial hash state registers.

16. The method of claim 15 wherein loading said hash key data comprises computing said hash key data in available slots in said encryption lanes.

17. The method of claim 15 wherein loading said hash key data comprises computing said hash key data in available slots in said authentication lanes.

18. The method of claim 15 wherein said first number and said second number are different.

19. The method of claim 15 wherein said first number and said operating number are different.

20. The method of claim 19 wherein said operating number is a non-integer multiple of said first number.

21. The method of claim 15 wherein said second number and said operating number are different.

22. The method of claim 21 wherein said operating number is a non-integer multiple of said second number.

* * * * *